(12) United States Patent
Nakadai et al.

(10) Patent No.: US 8,392,185 B2
(45) Date of Patent: *Mar. 5, 2013

(54) SPEECH RECOGNITION SYSTEM AND METHOD FOR GENERATING A MASK OF THE SYSTEM

(75) Inventors: Kazuhiro Nakadai, Wako (JP); Toru Takahashi, Kyoto (JP); Hiroshi Okuno, Kyoto (JP)

(73) Assignee: Honda Motor Co., Ltd., Tokyo (JP)

(*) Notice: Subject to any disclaimer, the term of this patent is extended or adjusted under 35 U.S.C. 154(b) by 484 days.

This patent is subject to a terminal disclaimer.

(21) Appl. No.: 12/543,759

(22) Filed: Aug. 19, 2009

(65) Prior Publication Data

US 2010/0082340 A1 Apr. 1, 2010

Related U.S. Application Data

(60) Provisional application No. 61/136,225, filed on Aug. 20, 2008.

(30) Foreign Application Priority Data

Aug. 7, 2009 (JP) .................................. 2009-185164

(51) Int. Cl.
G10L 15/20 (2006.01)
G10L 19/14 (2006.01)
G10L 15/06 (2006.01)
G10L 15/26 (2006.01)
G10L 17/00 (2006.01)
G10L 15/14 (2006.01)
G10L 15/28 (2006.01)
G10L 15/00 (2006.01)

(52) U.S. Cl. ........ 704/233; 704/243; 704/234; 704/231; 704/235; 704/246; 704/256; 704/255; 704/236; 704/240

(58) Field of Classification Search .................. 704/243, 704/233, 234, 231, 256, 255, 236, 240, 239, 704/270, 270.1, 275, 235, 246

See application file for complete search history.

(56) References Cited

U.S. PATENT DOCUMENTS

| 6,707,910 | B1* | 3/2004 | Valve et al. .............. 379/388.06 |
| 6,967,455 | B2* | 11/2005 | Nakadai et al. .......... 318/568.12 |
| 7,130,705 | B2* | 10/2006 | Amir et al. ...................... 700/94 |
| 2004/0252845 | A1* | 12/2004 | Tashev ............................ 381/56 |
| 2006/0056647 | A1* | 3/2006 | Ramakrishnan et al. ...... 381/119 |
| 2006/0136205 | A1* | 6/2006 | Song ............................. 704/243 |
| 2006/0206315 | A1* | 9/2006 | Hiroe et al. ................... 704/203 |
| 2007/0025564 | A1* | 2/2007 | Hiekata et al. ............... 381/94.2 |

(Continued)

OTHER PUBLICATIONS

Yamamoto, S.; Nakadai, K.; Nakano, M.; Tsujino, H.; Valin, J.-M.; Komatani, K.; Ogata, T.; Okuno, H.G.; , "Design and implementation of a robot audition system for automatic speech recognition of simultaneous speech," Automatic Speech Recognition & Understanding, 2007. ASRU. IEEE Workshop on , vol., No., pp. 111-116, Dec. 9-13, 2007.*

(Continued)

*Primary Examiner* — Edgar Guerra-Erazo
(74) *Attorney, Agent, or Firm* — Squire Sanders (US) LLP

(57) ABSTRACT

The speech recognition system of the present invention includes: a sound source separating section which separates mixed speeches from multiple sound sources; a mask generating section which generates a soft mask which can take continuous values between 0 and 1 for each separated speech according to reliability of separation in separating operation of the sound source separating section; and a speech recognizing section which recognizes speeches separated by the sound source separating section using soft masks generated by the mask generating section.

10 Claims, 13 Drawing Sheets

U.S. PATENT DOCUMENTS

2007/0133811 A1* 6/2007 Hashimoto et al. ............. 381/22
2008/0071540 A1* 3/2008 Nakano et al. ................ 704/251

OTHER PUBLICATIONS

S. Yamamoto, K. Nakadai, H. Tsujino, T. Yokoyama and H. G. Okuno: "Improvement of robot audition by interfacing sound source separation and automatic speech recognition with missing feature theory", Proceedings of the 2004 International Conference on Robotics and Automation (ICRA2004), pp. 1517-1523, 2004.(ICRA2004), pp. 1517-1523, 2004.*

B. Raj, et al., "Missing-Feature Approaches in Speech Recognition," Signal Processing Magazine, vol. 22, No. 5, pp. 101-116, 2005.*

Zheng Fang, Wu Wenhu, Fan.g Ditang. Center-distance continuous probability models and the distance measure. J. of Computer Science and Technology, 1998, 13(5): 426-437.*

McCowan, I.A., Morris, A.C. & Bourlard, B. (2002) "Improving speech recognition performance of small microphone arrays using missing data techniques", Proc ICSLP'02.*

Saruwatari, H.; Mori, Y.; Takatani, T.; Ukai, S.; Shikano, K. Hiekata, T.; Morita, T.;, "Two-stage blind source separation based on ICA and binary masking for real-time robot audition system," Intelligent Robots and Systems, 2005. (IROS 2005). 2005 IEEE/RSJ International Conference on, vol., No., pp. 2303-2308, Aug. 2-6, 2005.*

Roweis, S. T., "Factorial Models and Re-filtering for Speech Separation and Denoising",. EUROSPEECH 2003., 7(6):1009-1012, 2003.*

Shunichi Yamamoto et al., Genetic Algorithm-based Improvement of Robot Hearing Capabilities in Separating and Recognizing Simultaneous Speech Signals, (S. Yamamoto, et al, "Genetic Algorithm-Based Improvement of Robot Hearing Capabilities in Separating and Recognizing Simultaneous Speech Signals, " Proc. of IEA/AIE 2006 / LNSA 4031, pp. 207-217, 2006, AAAI.).

Michael L. Seltzer et al., a Bayesian classifier for spectrographic mask estimation for missing feature speech recognition, Speech Communication 43, 2004, pp. 379-393.

Shunichi Yamamoto et al., Enhanced Robot Speech Recognition Based on Microphone Array Source Separation and Missing Feature Theory, (S. Yamamoto, et al., "Enhanced Robot Speech Recognition Based on Microphone Array Source Separation and Missing Feature Theory," Proc. of ICRA 2005, pp. 1489-1494, 2005, IEEE.).

Jon Barker et al., Soft Decisions in Missing Data Techniques for Robust Automatic Speech Recognition, Dept. of Computer Science, University of Sheffield, (J. Barker, L. Josifovski, M. Cooke, and P. Green, "Soft decisions in missing data techniques for robust automatic speech recgonition," in Proc. ICSLP 2000, Beijing, China, Sept. 2000, pp. 373-376.).

Nicholas C. Makris, Chair, Program of the 131st Meeting of the Acoustical Society of America, May 13-17, 1996, J. Acoust. Soc. Am., vol. 99, No. 4, Apr. 1996, pp. 2449-2603.

Tatsuya Kawahara et al., Free Software Toolkit for Japanese Large Vocabulary Continuous Speech Recognition, (T. Kawahara, et al., "Free software toolkit for Japanese large vocabulary continuous speech recognition," Proc. of ICSLP 2000, vol. 4, pp. 476-479, 2000, ISCA).

Shunichi Yamamoto et al., Making a Robot Recognize Three Simultaneous Sentences in Real-Time, 2005 IEEE/RSJ International Conference on Intelligent Robots and Systems, 2005, pp. 897-902.

Lucas Parra et al., Geometric Source Separation: Merging Convolutive Source Separation with Geometric Beamforming, (Parra, L.; Alvino, C.; , "Geometric source separation: merging convolutive source separation with geometric beamforming," Neural Networks for Signal Processing XI, 2001. Proceedings of the 2001 IEEE Signal Processing Society Workshop , vol., No., pp. 273-282, 2001).

Ning Xiang et al., Cochair, Program of the 148th Meeting of the Acoustical Society of America, Nov. 15-19, 2004, J. Acoust. Soc. Am., vol. 116, No. 4, Oct. 2004, pp. 2473-2499.

Israel Cohen et al., Speech enhancement for non-stationary noise environments, Signal Processing vol. 81, 2001, pp. 2403-2418.

Y. Ephraim et al., Speech Enhancement Using a Minimum Mean-Square Error Log-Spectral Amplitude Estimator, IEEE Transactions on Acoustics, Speech, and Signal Processing, vol. ASSP-33, No. 2, Apr. 1985, pp. 443-445.

Ryu Takeda et al. "Artificial Intelligence and Cognitive Science" of the 69th Annual Convention IPS (Information Processing Society) Japan, pp. 2-585-2-586, published on Mar. 6, 2007.

Japanese Office Action; dated Oct. 9, 2012, Issued on corresponding Application No. 2009-185164.

* cited by examiner

SPEECH RECOGNITION SYSTEM AND METHOD FOR GENERATING A MASK OF THE SYSTEM

CROSS-REFERENCE RELATED APPLICATIONS

This application claims the benefit of U.S. Provisional Application No. 61/136,225 filed on Aug. 20, 2008, and claiming priority of Japanese patent application JP 2009-185164, filed on Aug. 7, 2009. The disclosure of the priority applications are hereby incorporated by reference herein in their entirety.

BACKGROUND OF THE INVENTION

1. Field of the Invention

The present invention relates to a speech recognition system for simultaneous recognition of speeches from multiple sources and a method for generating a mask for the speech recognition system.

2. Description of the Related Art

The technology of simultaneous recognition of speeches from multiple sources is important for robots that work in the real environment. A speech recognition system for simultaneous recognition of speeches from multiple sources separates speeches according to sources and performs speech recognition using the acoustic feature of a separated speech. In speech recognition a mask prepared according to reliability of separation is used for each acoustic feature (for example, Reference 2). Conventionally hard masks which are binary, taking a value of 0 or 1 are used as such masks (for example, Reference 3). Although soft masks which take continuous values between 0 and 1 are known (for example, Reference 4), a soft mask used for a speech recognition system for simultaneous recognition of speeches from multiple sources has not been developed. The reason is that conventionally those skilled in the art thought that hard masks are more appropriate for a speech recognition system for simultaneous recognition of speeches from multiple sources than soft masks (for example, Reference 2). Thus, a speech recognition system provided with a soft mask appropriately designed for simultaneous recognition of speeches from multiple sources and having an increased speech recognition rate has not been developed.

Accordingly, there is a need for a speech recognition system provided with a soft mask appropriately designed for simultaneous recognition of speeches from multiple sources and having a higher speech recognition rate has not been developed.

SUMMARY OF THE INVENTION

A speech recognition system according to the invention includes a sound source separating section which separates mixed speeches from multiple sound sources; a mask generating section which generates a soft mask which can take continuous values between 0 and 1 for each separated speech according to reliability of separation in separating operation of the sound source separating section; and a speech recognizing section which recognizes speeches separated by the sound source separating section using soft masks generated by the mask generating section.

The speech recognition system according to the invention recognizes speeches using a soft mask which can take continuous values between 0 and 1 for each separated speech depending on reliability of separation to increase a speech recognition rate.

In a speech recognition system according to an embodiment of the invention, the soft masks are determined using a sigmoid function $$1/(1+\exp(-a(R-b)))$$

where R represents reliability of separation and a and b represent constants.

In the speech recognition system according to the embodiment, the soft masks can be easily adjusted by changing constants a and b of the sigmoid function.

In a speech recognition system according to another embodiment of the invention, the soft masks are determined using a probability density function of a normal distribution, which has a variable R which represents reliability of separation.

In the speech recognition system according to the embodiment, the soft masks can be easily adjusted by changing a form of the probability density function of the normal distribution.

A method for generating a soft mask for a speech recognition system according to the invention, is used to generate a soft mask for the system including: a sound source separating section which separates mixed speeches from multiple sound sources; a mask generating section which generates a soft mask which can take continuous values between 0 and 1 for each separated speech according to reliability of separation in separating operation of the sound source separating section; and a speech recognizing section which recognizes speeches separated by the sound source separating section using soft masks generated by the mask generating section, the soft mask being determined using a function of reliability of separation, which has at least one parameter. The method includes the steps of: determining a search space of said at least one parameter; obtaining a speech recognition rate of the speech recognition system while changing a value of speech recognition system in the search space; and setting the value which maximizes a speech recognition rate of the speech recognition system to said at least one parameter.

In the method for generating a soft mask for a speech recognition system according to the invention, the soft mask is determined using a function of reliability of separation, which has at least one parameter. Accordingly, the at least one parameter can be determined such that the speech recognition rate is maximized by obtaining speech recognition rates for the soft mask with various values of the at least one parameter.

A method for generating a soft mask for a speech recognition system according to the invention, is used to generate a soft mask for the system including: a sound source separating section which separates mixed speeches from multiple sound sources; a mask generating section which generates a soft mask which can take continuous values between 0 and 1 for each separated speech according to reliability of separation in separating operation of the sound source separating section; and a speech recognizing section which recognizes speeches separated by the sound source separating section using soft masks generated by the mask generating section, the soft mask being determined using a function of reliability of separation, which has at least one parameter. The method includes the steps of: obtaining a histogram of reliability of separation; and determining a value of said at least one parameter from a form of the histogram of reliability of separation.

In the method for generating a soft mask for a speech recognition system according to the invention, the soft mask is determined using a function of reliability of separation, which has at least one parameter. Accordingly, the at least one parameter can be appropriately determined by obtaining a form of the histogram of reliability of separation.

In a method for generating a soft mask for a speech recognition system according to an embodiment of the invention, assuming that μ1 and μ2 (μ1<μ2)

indicate mean values and

σ1 and σ2 indicate standard deviations and R indicates reliability of separation, the mean values and standard deviations μ1, μ2, σ1 and σ2 are estimated by fitting the histogram of reliability of separation R with a first probability density function of normal distribution f1(R) which has (μ1, σ1)

and a second probability density function of normal distribution f2(R) which has (μ2, σ2)

and the soft mask is generated using f1(R), f2(R),

μ1 and μ2.

In the method for generating a soft mask for a speech recognition system according to the embodiment, the soft mask can be easily generated by fitting the histogram of reliability of separation R with probability density functions of normal distributions.

In a method for generating a soft mask for a speech recognition system according to another embodiment of the invention, assuming that a value of the soft mask is S(R) and f(R)=f1(R)+f2(R), S(R)=0 when R<μ1, S(R)=f2(R)/f(R) when μ1≦R≦μ2

S(R)=1 when μ2<R.

In the method for generating a soft mask for a speech recognition system according to the embodiment, the soft mask can be easily determined by using the probability density functions of normal distributions, obtained from the histogram of reliability of separation R.

In a method for generating a soft mask for a speech recognition system according to another embodiment of the invention, assuming that a value of the soft mask is S(R), $$f1'(R) = \frac{1}{\sqrt{2\pi\sigma^2}} \text{ when } R < \mu 1,$$

$$f1'(R) = f1(R) \text{ when } \mu 1 \leq R,$$

$$f2'(R) = f2(R) \text{ when } R < \mu 2,$$

$$f2'(R) = \frac{1}{\sqrt{2\pi\sigma^2}} \text{ when } \mu 2 \leq R,$$

and $$f'(R) = f1'(R) + f2'(R),$$

$$SM(R) = \frac{f2'(R)}{f'(R)}.$$

In the method for generating a soft mask for a speech recognition system according to the embodiment, the soft mask can be easily determined by using the probability density functions of normal distributions, obtained from the histogram of reliability of separation R.

In a method for generating a soft mask for a speech recognition system according to another embodiment of the invention, a value of R at the intersection of f1(R) and f2(R) which satisfies

μ1<R<μ2 is set to b and a is determined such that

1/(1+exp(−a(R−b)))

is fit to f2(R)/f(R)

and the value of the MFM S(R) is determined by

S(R)=1/(1+exp(−a(R−b))).

In the method for generating a soft mask for a speech recognition system according to the embodiment, the soft mask can be easily determined by using the probability density functions of normal distributions, obtained from the histogram of reliability of separation R.

DETAILED DESCRIPTION OF THE INVENTION

Figure 1:
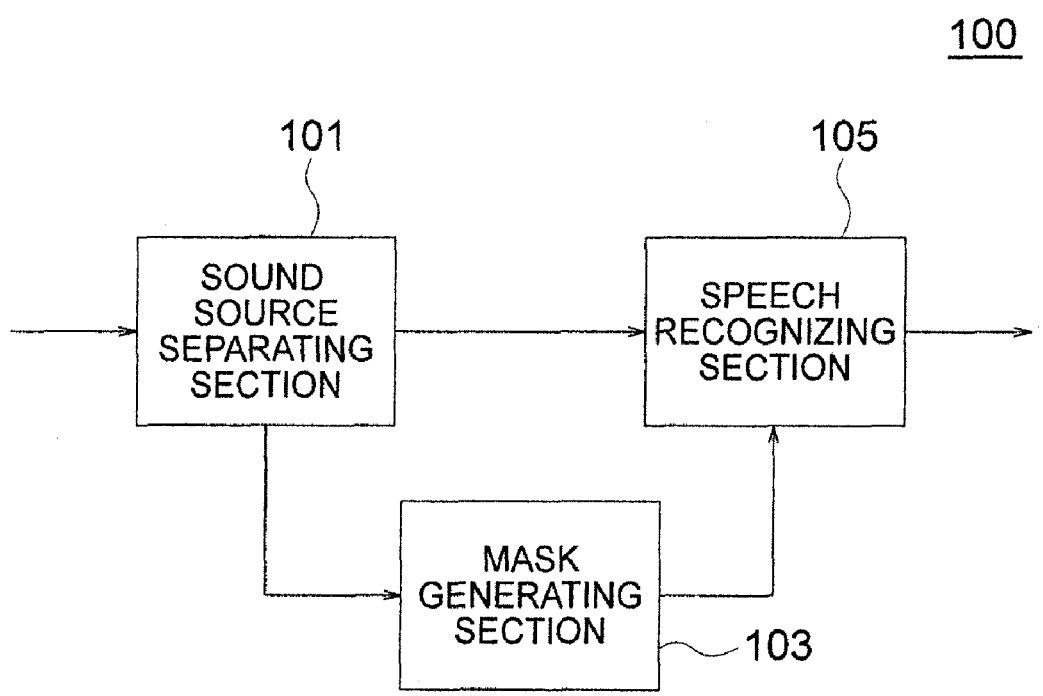
FIG. 1 illustrates a configuration of a speech recognition system according to an embodiment of the present invention.

FIG. 1 illustrates a configuration of a speech recognition system 100 according to an embodiment of the present invention. The speech recognition system 100 includes a sound source separating section 101, a mask generating section 103 and a speech recognizing section 105.

The speech recognition system 100 performs simultaneous recognition of speeches from multiple sound sources such as multiple speakers. The sound source separating section 101 receives mixed speeches from multiple sound sources, for example, through 8-channel microphone array. The sound source separating section 101 sends separated sounds to the speech recognizing section 105. Further, the sound source separating section 101 sends information which is used by the mask generating section 103 for generating masks as described below, to the mask generating section 103. The mask generating section 103 generates masks using the information form the sound source separating section 101 and sends the masks to the speech recognizing section 105. The speech recognizing section 105 obtains acoustic features of the separated sounds and performs speech recognition using the masks from the mask generating section 103. Functions of the speech recognizing section 105, the sound source separating section 101 and the mask generating section 103 will be described below.

Speech Recognizing Section

The speech recognizing section 105 outputs a sequence of phonemes from a sequence of acoustic feature sets of separated speech and the corresponding sequence of masks based on missing-feature theory. An acoustic feature set and a mask are calculated for each time frame. A sequence of acoustic feature sets means acoustic feature sets each of which is calculated for each time frame and which are arranged in time order while a sequence of masks means masks each of which is calculated for each time frame and which are arranged in time order. The speech recognizing section 105 is a hidden Markov model (HMM) based recognizer, which is commonly used in conventional Automatic Speech Recognition (ASR) systems. The difference between the ASR method of the speech recognizing section 105 according to the embodiment and conventional ASR method is described below.

In conventional ASR methods, estimation of a path with maximum likelihood is based on state transition and output probabilities in the HMM. This process of estimating output probability is modified in the speech recognizing section 105 according to the embodiment as follows. Let $$M=[M(1), \ldots M(F)]$$

be an Missing-Feature Mask (MFM) vector and $M(f)$ represent the reliability of the f-th acoustic feature. F is the size of the MFM vector and a MFM vector for a time frame has F elements. The output probability $$b_j(x)$$

is given by $$b_j(x) = \sum_{l=1}^{L} P(l|S_j) \exp\left\{\sum_{f=1}^{F} M(f) \log g(x(f)|l, S_j)\right\} \quad (1)$$

where $P(|)$ is a probability operator, and L represents the number of distributions of mixture of normal distributions while l represents an index of the number.

$$x=[x(1), \ldots, x(F)]$$

is an acoustic feature vector, F is the size of the acoustic feature vector. That is, an acoustic feature vector for a time frame has F elements.

$$S_j$$

is the j-th state, and $$g(x(f)|l, S_j)$$

is a mixture of normal distributions in j-th state. If knowledge about any unreliable features is not available, the equation of output probability is equivalent to the conventional equation.

For the speech recognizing section 105, Multiband Julius [References 5 and 6] is used, which is an extension of the Japanese real-time large vocabulary speech recognition engine Julius [Reference 7].

Sound Source Separating Section

Figure 2:
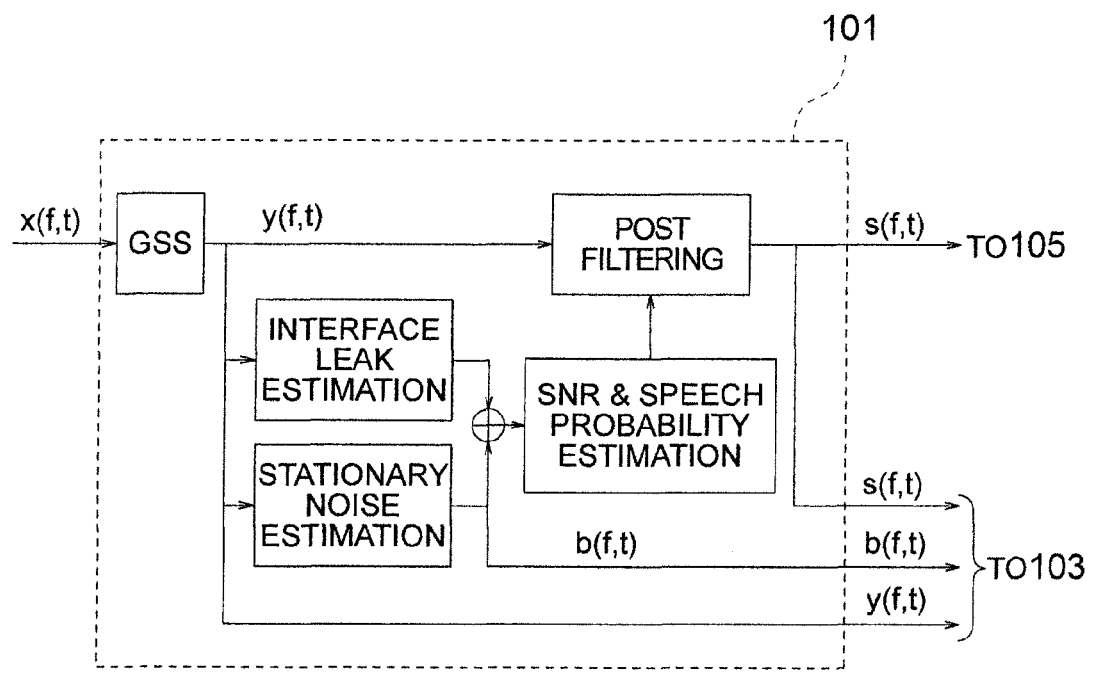
FIG. 2 illustrates a configuration of the sound source separating section.

FIG. 2 illustrates a configuration of the sound source separating section. As shown in FIG. 2, the sound source separating section 101 uses geometric Source Separation (GSS) with a multi-channel post filter [References 3, 8 and 11].

The GSS approach of Reference 9 has been modified so as to provide faster adaptation using a stochastic gradient and shorter time frame estimations [Reference 11]. The initial separation using GSS is followed by the multi-channel post-filter based on a generalization of beamformer post-filtering [Reference 11] for multiple sources. This post-filter uses adaptive spectral estimation of background noise and interfering sources for enhancing the signal produced during the initial separation.

The essential feature of the sound source separating section 101 is that the noise estimate is decomposed into stationary and transient components, which are assumed to be due to the leakage between the output channels in the initial separation stage.

This GSS method operates in the frequency domain. Let $$s_m(f,t)$$

be real (unknown) sound source m at time frame t and for discrete frequency f. The vector corresponding to the sources $$s_m(f,t)$$

is $$s(f,t)$$

and matrix $$A(f)$$

is the transfer function leading from the sources to the microphones. The signal observed at microphones is expressed as $$x(f,t)=A(f)s(f,t)+n(f,t) \quad (2)$$

where $$n(f,t)$$

is the non-coherent background noise. The matrix $$A(f)$$

can be estimated using the result of a sound localization algorithm. Assuming that all transfer functions have unity gain, the elements of $$A(f)$$

can be expressed as $$a_{ij}(f)=\exp\{-j2\pi f \delta_{ij}\} \quad (3)$$

The separation result is then defined as $$y(f,t)=W(f,t) \times x(f,t)$$

where $$W(f,t)$$

is the separation matrix. This matrix is estimated using the GSS algorithm described in Reference 11.

The output of the GSS algorithm is then enhanced by a frequency-domain post-filter based on the optimal estimator originally proposed in Reference 12.

An input of the multi-channel post-filter is the output of GSS;

$$y(f,t)=(y_1(f,t), \ldots, y_M(f,t)).$$

An output of the multi-channel postfilter is $\hat{s}$ (f, t), which is defined as $$\hat{s}(f,t)=G(f,t)y(f,t), \quad (4)$$

where G(f, t) is a spectral gain. The estimation of G(f, t) is based on minimum mean-square error estimation of spectral amplitude. To estimate G(f, t), noise variance is estimated. The noise variance estimation $\lambda m(f, t)$ is expressed as $$\lambda_m(f,t)=\lambda_m^{stat.}(f,t)+\lambda_m^{leak}(f,t) \quad (5)$$

where $\lambda_m^{stat.}$ (f,t) is the estimate of the stationary component of the noise for source m at frame t for frequency f, and $\lambda_m^{leak}$ (f, t) is the estimate of source leakage.

The stationary noise estimate, $\lambda_m^{leak}$ (f, t), is obtained using the minima controlled recursive average (MCRA) [Reference 10]. To estimate $\lambda_m^{leak}$, it is assumed that the interference from other sources is reduced by factor η (typically −10 dB≦η≦−5 dB) by LSS. The leakage estimate is expressed as below.

$$\lambda_m^{leak}(f, t) = \eta \sum_{i=0, i \neq m}^{M-1} Z_i(f, t) \quad (6)$$

where Zi(f, t) is the smoothed spectrum of the nr-th source, $Y_m$ (f, t) and recursively defined [11].

$$Z_m(f,t) = \alpha Z_m(f,t-1) + (1-\alpha) Y_m(f,t) \quad (7)$$

α is −0.7 in the equation described above.

Mask Generating Section

Feature vector of 48 spectral-related features are used. The MFM is a vector corresponding to 24 static spectral features and 24 dynamic spectral features. Each element of a vector represents the reliability of each feature. In conventional MFM generation, a binary MFM (i.e., 1 for reliable and 0 for unreliable) was used. The mask generating section 103 generates a soft MFM whose element of vector ranges from 0.0 to 1.0. In this context, "generating a soft MFM" means determining a value of the soft MFM according to a formula defining the soft MFM.

The mask generating section 103 performs calculation of a MFM using input $y_m(f, t)$, output $\hat{s}_m(f, t)$, and the estimated background noise, b(f, t), of the multi-channel post-filter. These parameters are calculated from the multi-channel input speech with object related transfer function (ORTF). The variables filtered by the Mel filter bank are Ym (f, t), Ŝm (f, t), and BN(f, t), respectively. The Mel filter bank is a group of filters arranged at regular intervals on the Mel frequency axis.

For each Mel-frequency band, the feature is considered reliable if the ratio of the output energy over the input energy is greater than a threshold, $\theta_{hard}$. This assumes that the more noise present in a certain frequency band, the lower the post-filter gain will be for that band.

Let R(f, t) be the reliability of separation defined as $$R(f, t) = \frac{\hat{S}_m(f, t) + BN(f, t)}{Y_m(f, t)} \quad (8)$$

Y is a sum of speech Ŝm, background noise BN and leak. So, the reliability of separation becomes 1 when there exists no leak (when a speech is completely separated without blending of any other speeches) and approaches 0 as the leak becomes larger.

The hard MFM $\theta_{hard}$ (f, t) for the static spectral feature [x(1), . . . , x(24)] is defined as $$HM_s(f, t) = w_{hard} Q_{hard}(f, t | \theta_{hard}) \quad (9)$$

$$Q_{hard}(f, t | \theta_{hard}) = \begin{cases} 1, & R(f, t) > \theta_{hard} \\ 0, & \text{otherwise} \end{cases} \quad (10)$$

where whard is weight factor (0.0≦whard≦1.0). The hard MFM HMd(f, t) for the dynamic spectral features
 [x(25), . . . , x(48)]
is defined as below.

$$HM_d(f, t) = \prod_{j=t-2, j \neq t}^{t+2} Q_{hard}(f, j | \theta_{hard}) \quad (11)$$

The unweighted hard mask ($Q_{hard}(f, t/\theta_{hard})$) for the dynamic feature is 1 if only the hard masks for the static features within two contiguous frames are 1.

The soft MFM $SM_s$ (f, t) for the static spectral feature
 [x(1), . . . , x(24)]
is defined as $$SM_s(f, t) = w Q_{soft}(R(f, t | \theta_{soft}, k) \quad (12)$$

$$Q_{soft}(x | \theta_{soft}, k) = \begin{cases} \dfrac{1}{1 + \exp(-k(x - \theta_{soft}))}, & x > \theta_{soft} \\ 0, & \text{otherwise,} \end{cases} \quad (13)$$

where $w_{soft}$ is weight factor (0.0≦$w_{soft}$≦1.0). $Q_{soft}$ (•|k, $\theta_{soft}$) is a modified sigmoid function which has two tunable parameters. k and $\theta_{soft}$, correspond to the tilt and position of the sigmoid function. How to determine the parameters of the modified sigmoid function will be described later.

The dynamic spectral features are robust against leak noise and stationary background noise because the dynamic spectral feature defined as difference of contiguous static features can cancel leak noise and stationary background noise. The static spectral feature is less robust than dynamic spectral feature against such noises. Therefore, it is expected that recognition rate is improved when contribution of the dynamic spectral feature is higher than that of the static spectral feature. To increase the contribution of the dynamic spectral feature, it is effective to set a small value to w.

The soft MFM $SM_d$(f, t) for the dynamic spectral feature is defined as below.

$$SM_d(f, t) = \prod_{j=t-2, j \neq t}^{t+2} Q_{soft}(R(f, j | k, \theta_{soft})) \quad (14)$$

Figure 9A:
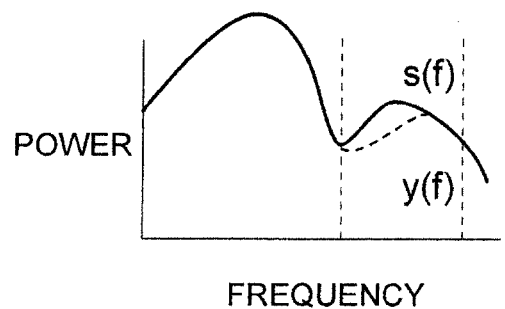
FIGS. 9A and 9C conceptually illustrate the hard mask.
Figure 9B:
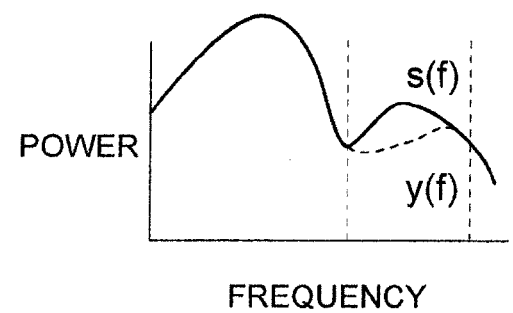
FIGS. 9B and 9D conceptually illustrate the soft mask.
Figure 9C:
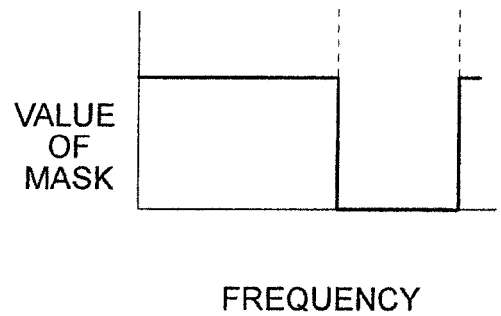
Figure 9D:
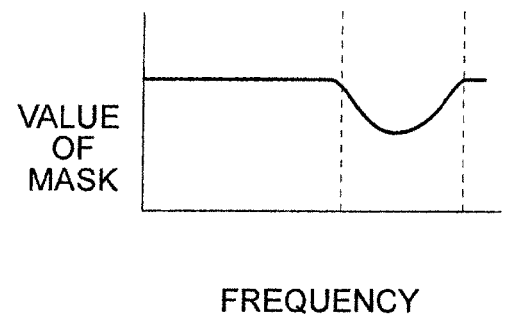

FIGS. 9A to 9B conceptually illustrate the hard mask and the soft mask. FIGS. 9A and 9C illustrate the hard mask while FIGS. 9B and 9D illustrate the soft mask. In FIGS. 9A and 9B, the horizontal axis indicates frequency while the vertical axis indicates power. In FIGS. 9A and 9B the solid line and the dotted line indicate the spectral feature of a clean speech and that of a distorted speech, respectively. A difference between the solid line and the dotted line at a frequency indicates a power of distortion. In FIGS. 9C and 9D, the horizontal axis indicates frequency while the vertical axis indicates a value of the mask. In FIGS. 9C and 9D the solid line indicates a value of the mask. The hard mask shown in FIG. 9C excludes a distorted portion of the spectral feature using a threshold such that the distorted portion is not used for calculation of likelihood. The soft mask shown in FIG. 9D assigns weights to a distorted portion of the spectral feature according to the distortion to use the distorted portion for calculation of likelihood. Thus, the hard mask does not effectively use information included in a distorted portion of the spectral feature.

Accordingly, an appropriately obtained soft Mask is expected to increase a speech recognition rate.

In the above, the soft MFM was created using the modified sigmoid function. In general a soft MFM can be created in various methods. Various methods to create a soft MFM will be described below.

Figure 12:
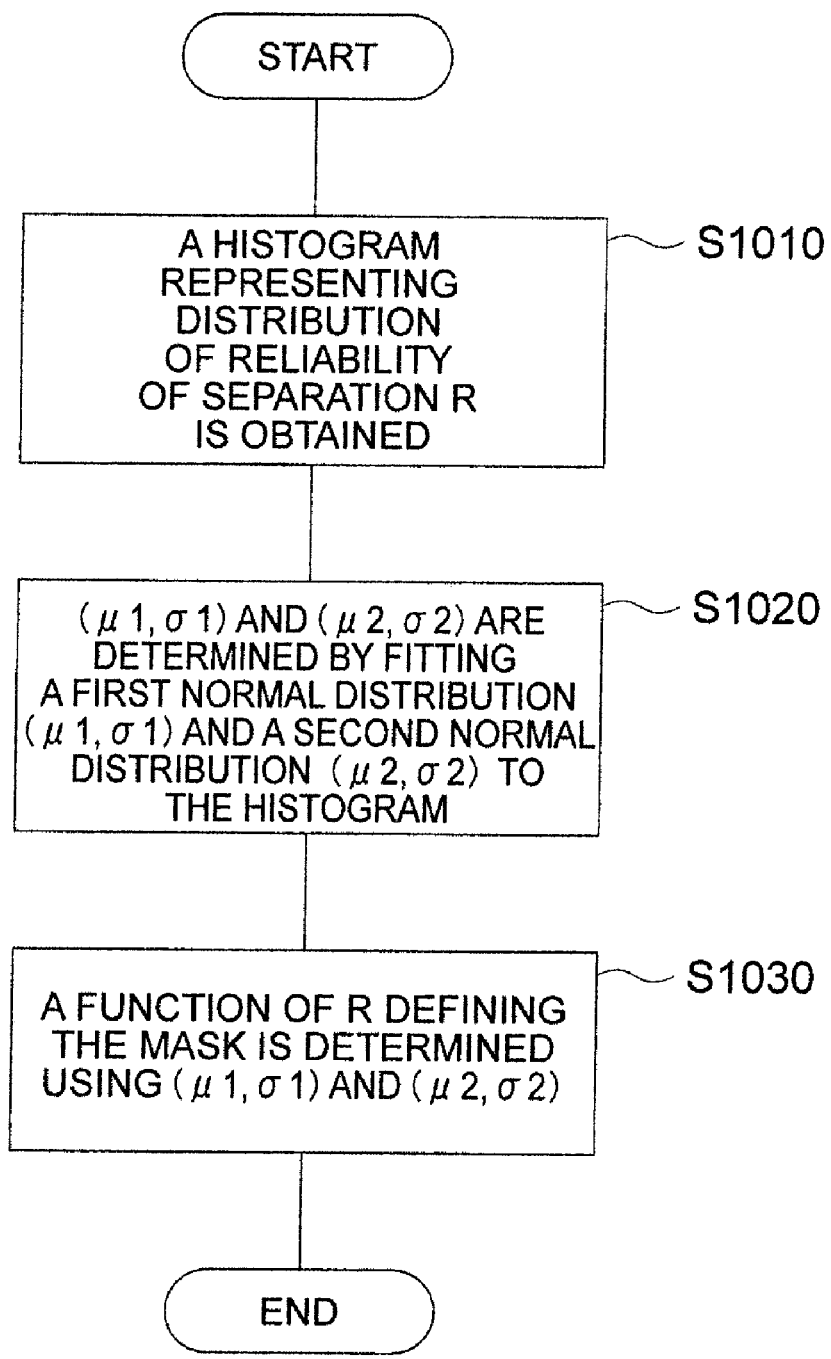
FIG. 12 is a flow chart which illustrates a method for generating a soft MFM, using a histogram representing a frequency distribution of reliability of separation R.

FIG. 12 is a flow chart which illustrates a method for generating a soft MFM, using a histogram representing a frequency distribution of reliability of separation R. In this context, "generating a soft MFM" means determining a formula defining the soft MFM. More specifically, the formula defining the soft MFM is determined as a function of reliability of separation R.

In step S1010 of FIG. 12, a histogram representing a frequency distribution of reliability of separation R is obtained.

Figure 3:
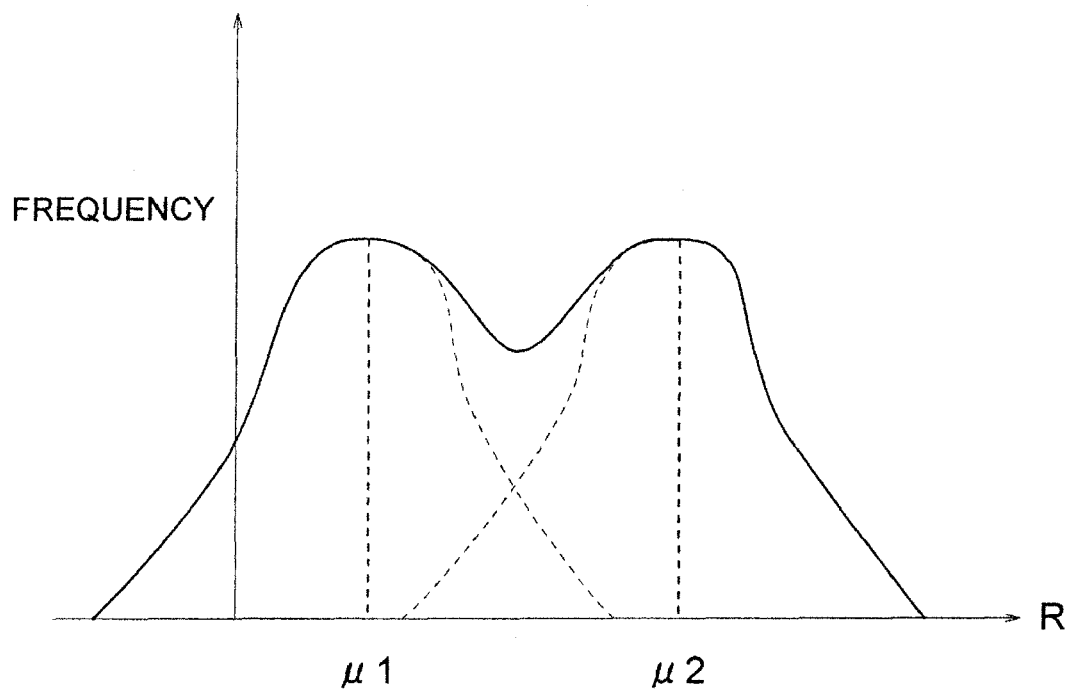
FIG. 3 is a histogram showing a frequency distribution of reliability of separation R.

FIG. 3 is a histogram representing a frequency distribution of reliability of separation R. The horizontal axis indicates a value of reliability of separation while the vertical axis indicates frequency distribution.

In step S1020 of FIG. 12, by fitting a normal distribution mixture model to the histogram obtained in step S1010 using EM (Expectation-maximization) algorithm, the mean and standard deviation $(\mu1, \sigma1)$ of the first normal distribution f1(R) and the mean and standard deviation $(\mu2, \sigma2)$ of the second normal distribution f2(R) are estimated.

In step S1030 of FIG. 12, using $(\mu1, \sigma1)$ and $(\mu2, \sigma2)$ obtained in step S1020, a soft MFM can be determined as described below.

First Method

Figure 4:
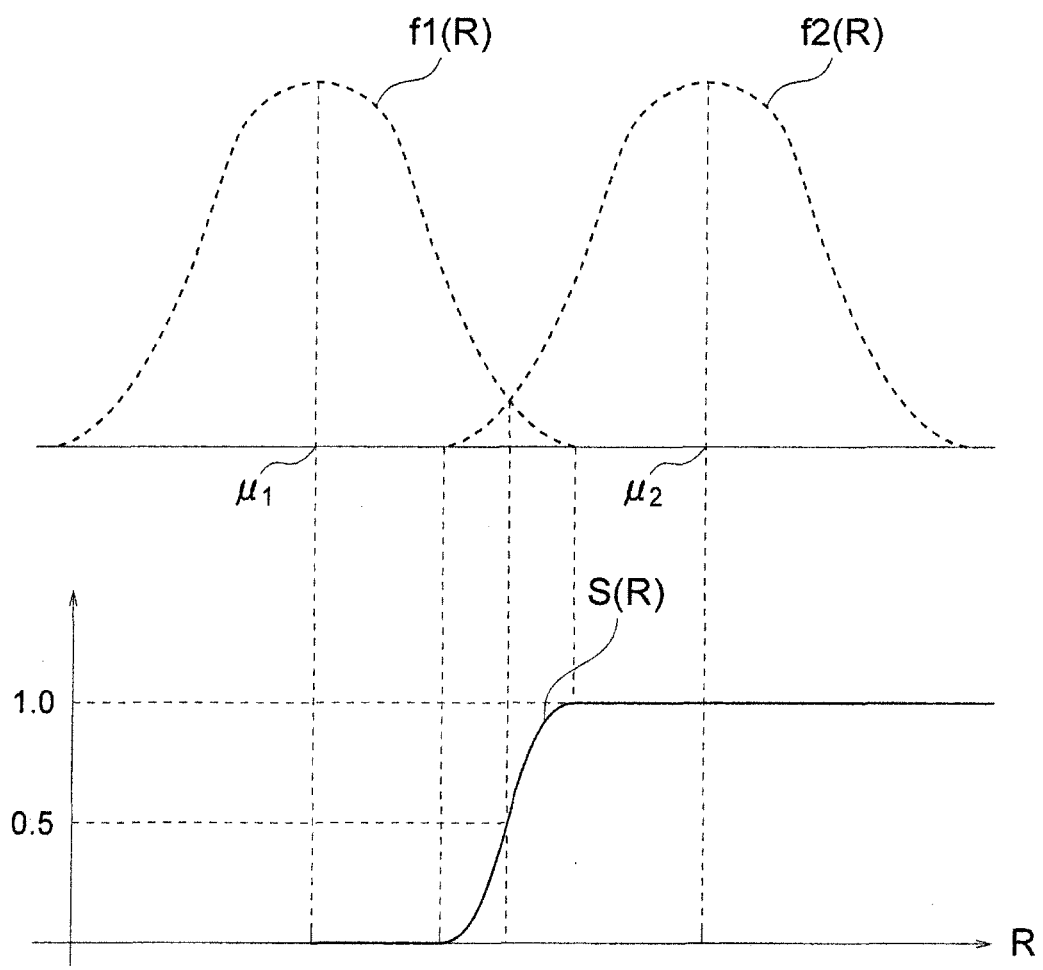
FIG. 4 illustrates the first method to create a MFM.

FIG. 4 illustrates the first method to create a MFM. Assuming that a value of the MFM is S(R) and f(R)=f1(R)+f2(R), S(R)=0 when R<$\mu1$,
S(R)=f2(R)/f(R) when $\mu1 \leq R \leq \mu2$
S(R)=1 when $\mu2$<R.

Second Method

Figure 5:
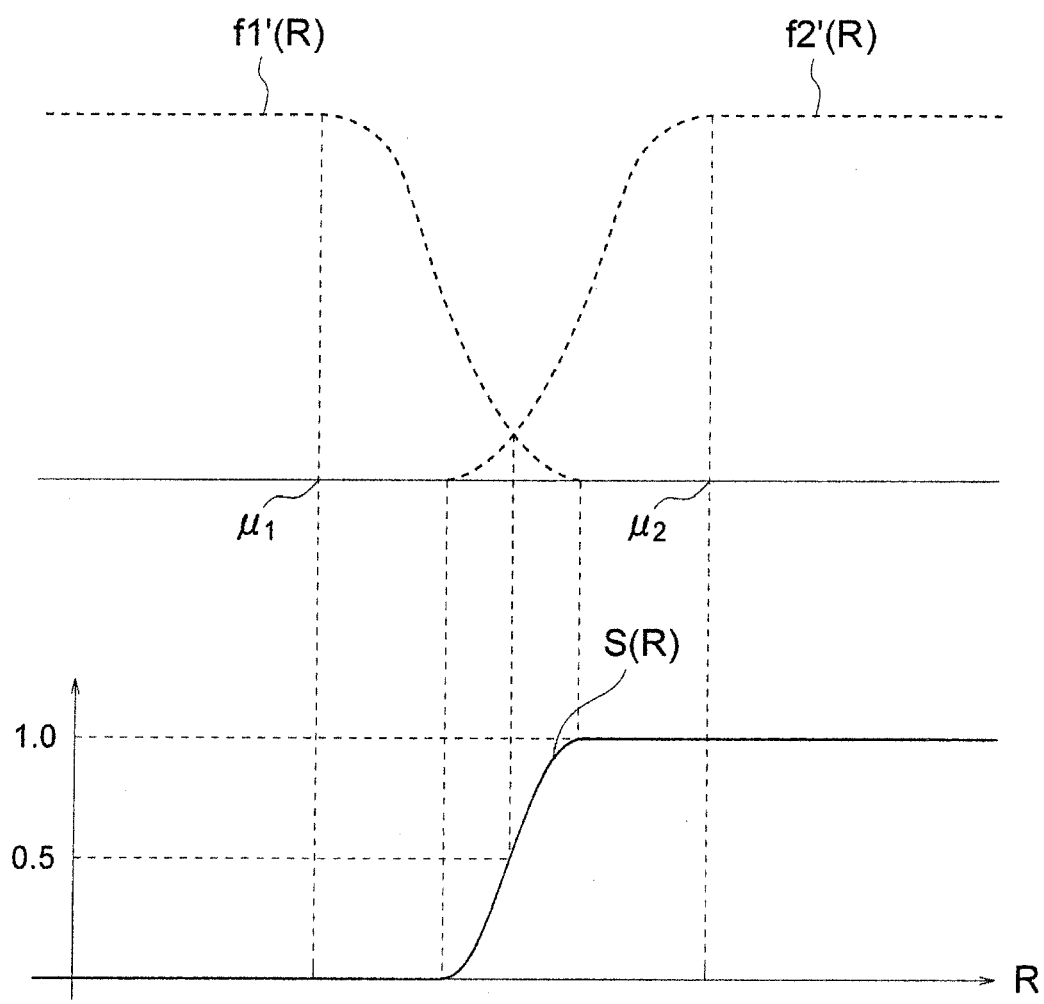
FIG. 5 illustrates the second method to create a MFM.

FIG. 5 illustrates the second method to create a MFM. Assuming that a value of the MFM is S(R), $$f1'(R) = \frac{1}{\sqrt{2\pi\sigma^2}} \text{ when } R < \mu1,$$

$$f1'(R) = f1(R) \text{ when } \mu1 \leq R,$$

$$f2'(R) = f2(R) \text{ when } R < \mu2,$$

$$f2'(R) = \frac{1}{\sqrt{2\pi\sigma^2}} \text{ when } \mu2 \leq R,$$

and $$f'(R) = f1'(R) + f2'(R),$$

$$SM(R) = \frac{f2'(R)}{f'(R)}.$$

Third Method

Figure 6:
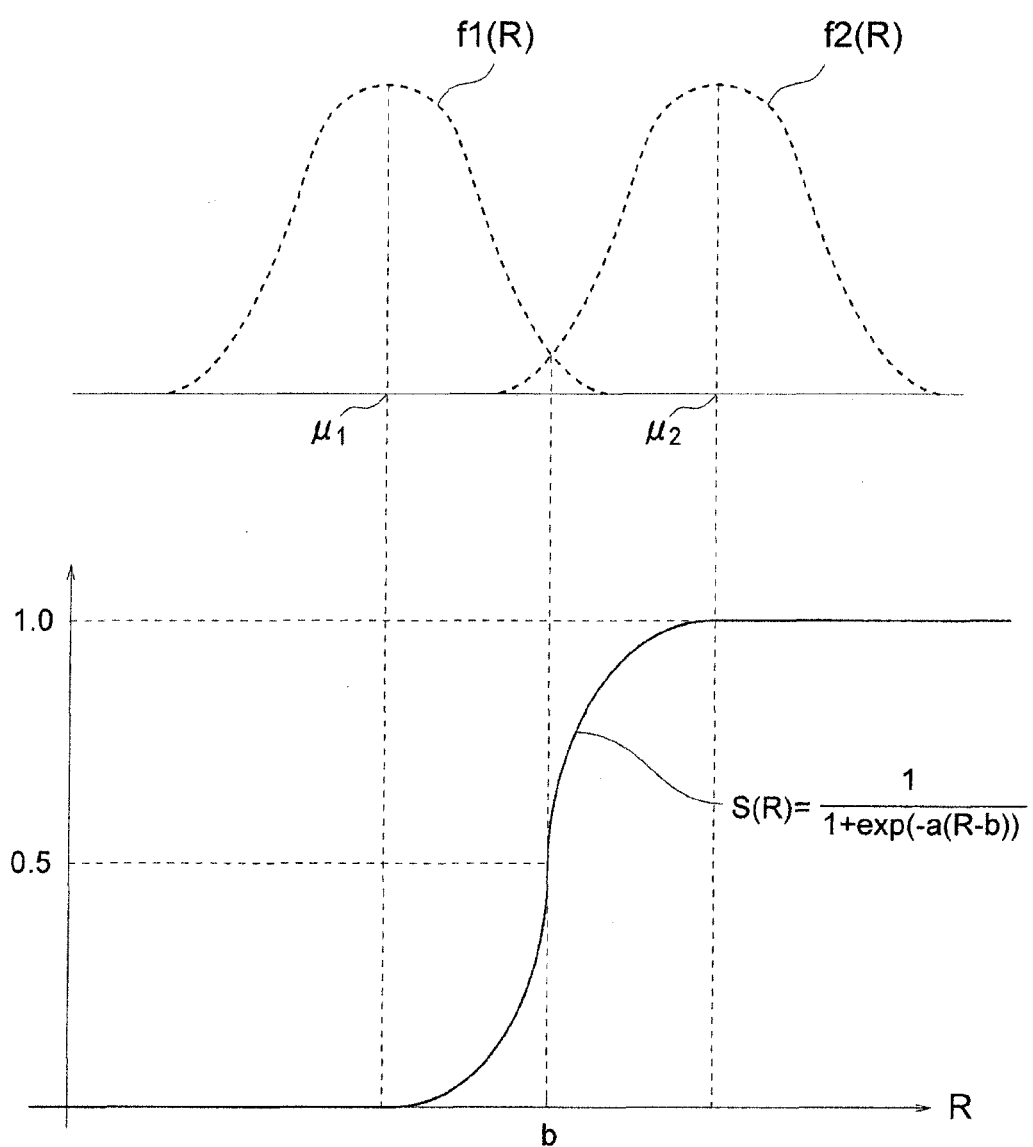
FIG. 6 illustrates the third method to create a MFM.

FIG. 6 illustrates the third method to create a MFM. A value of R at the intersection of f1(R) and f2(R) which satisfies $\mu1 < R < \mu2$ is set to b and a is determined such that $1/(1+\exp(-a(R-b))$ is fit to f2(R)/f(R)

and the value of the MFM S(R) is determined by $S(R)=1/(1+\exp(-a(R-b)))$.

Experiments

To evaluate the efficiency of the speech recognition system according to the embodiment, experiments on recognition of three simultaneous speech signals were performed. A humanoid robot (SIG2 robot) was used for the experiments with eight omnidirectional microphones symmetrically placed on the body. The transfer function of the robot's body affected the captured sound since the microphones were not in the air.

Figure 7:
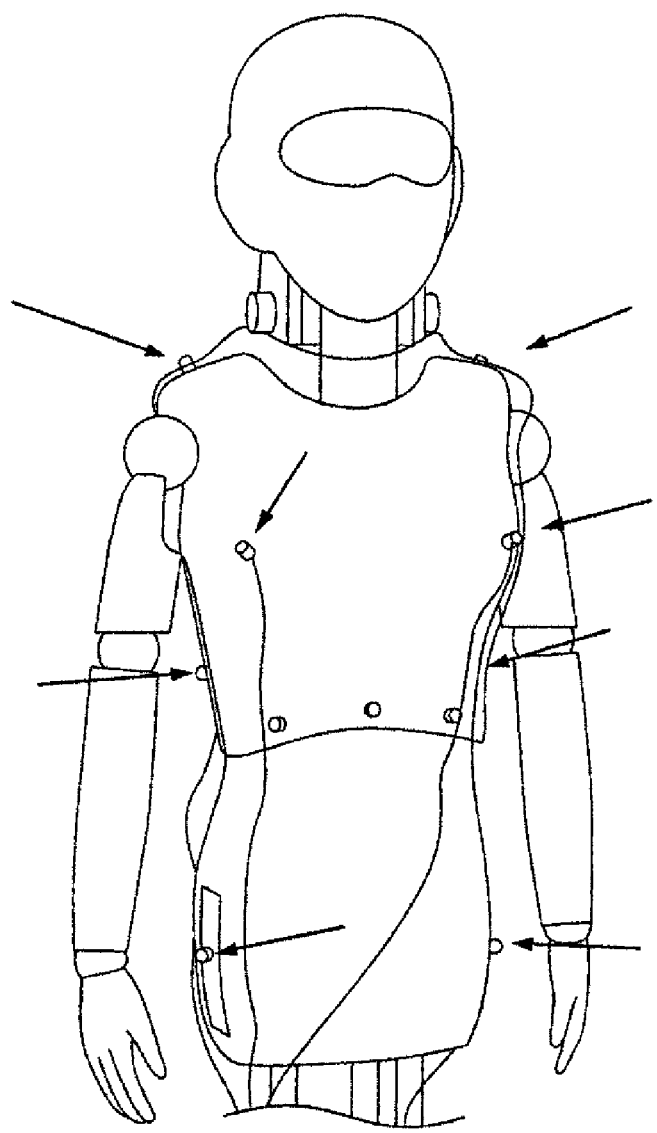
FIG. 7 shows positions of the microphones set on the robot.

FIG. 7 shows positions of the microphones set on the robot. In FIG. 7, the positions of the microphones are indicated by arrows.

Three loudspeakers were used to generate three simultaneous speech signals and the simultaneous speech signals were recorded. The reverberation time was about 0.35 seconds.

Figure 8:
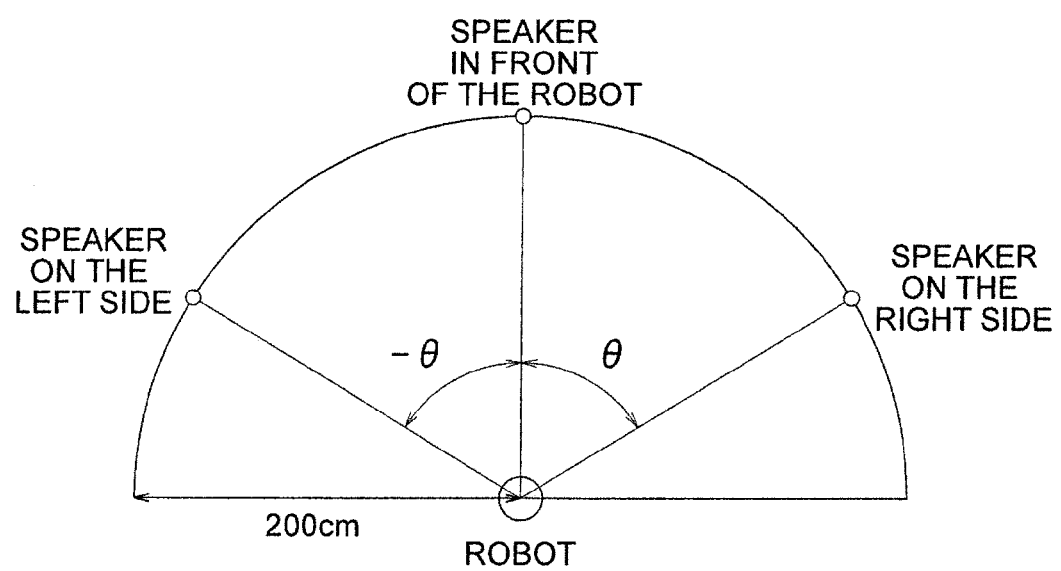
FIG. 8 shows an arrangement of the loudspeakers and the robot.

FIG. 8 shows an arrangement of the loudspeakers and the robot. One of the loudspeakers was fixed in front of the robot The other two loudspeakers were set at 10, 20, 30, 40, 50, 60, 70, 80, or 90 degrees to the left and right of the robot. In FIG. 8 an angle to the right is represented by $\theta$ while an angle to the left is represented by $-\theta$. In other words, the experiments were performed for 9 configurations with different angles $\theta$. The volume of the loudspeakers was set at the same level for all locations. 200 combinations of three different words were played for each configuration. The words were selected from 216 phonetically balanced words distributed by Advanced Telecommunications Research Institute International (ATR). In other words, the speech recognition system according to the embodiment recognized three simultaneous speech signals 200 times in each configuration.

To optimize the parameters, $\theta_{hard}$, $\theta_{soft}$, k, and w, in Equations (9), (12), and (13), experiments were performed on recognition of three simultaneous speech signals.

Figure 13:
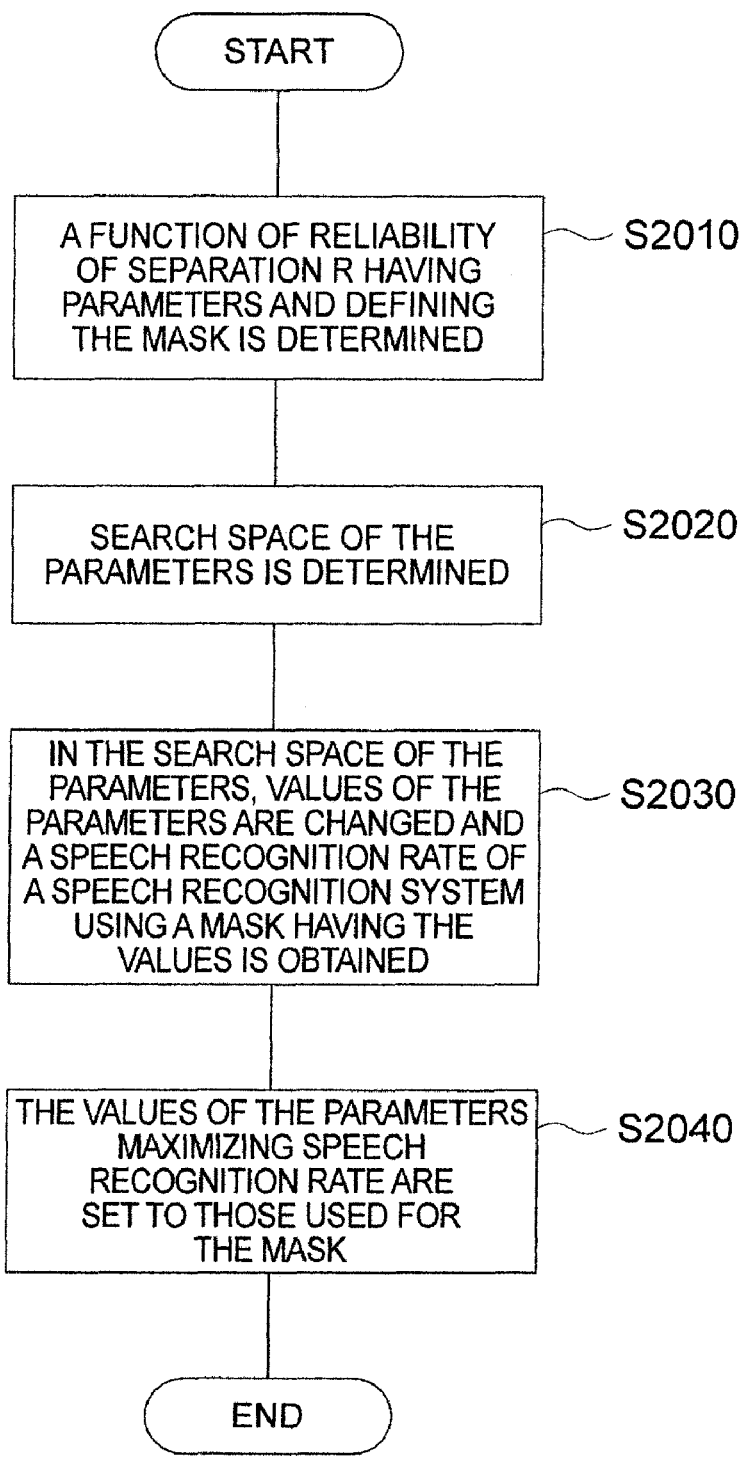
FIG. 13 is a flow chart which illustrates a method for generating a mask.

FIG. 13 is a flow chart which illustrates a method for generating a mask.

In step S2010 of FIG. 13, a function of reliability of separation R having parameters and defining the mask is determined. The function defining the hard mask is represented by Equations (9) and (10) and the parameter is $\theta_{hard}$. The function defining the soft mask is represented by Equations (12) and (13) and the parameters are $\theta_{soft}$, k, and w.

In step S2020 of FIG. 13, the parameter search space is obtained. Table 1 shows the parameter search space.

TABLE 1

| Parameters | Hard mask | Soft mask |
| --- | --- | --- |
| Threshold $\theta_{hard}$ | 0.0-0.4 (step 0.05) | — |
| Tilt k | — | −80-160 (step 20) |
| Center $\theta_{soft}$ | — | −0.0 0.4 (step 0.05) |
| Weight w | 0.0-1.0 (step 0.1) | 0.0-1.0 (step 0.1) |

In step S2030 of FIG. 13, a value of the parameter or values of parameters are changed in the parameter search space and a speech recognition rate of a speech recognition system using a mask having the value or the values is obtained.

In step S2040 of FIG. 13, the value of the parameter or the values of the parameters maximizing the speech recognition rate are set to those used for the mask.

The results show that the optimal threshold (the parameter maximizing the speech recognition rate) for the hard mask $\theta_{hard}$ was 0.1 and the optimal parameter set (the parameter set maximizing the speech recognition rate) for the soft mask was $$\{w, \theta_{soft}, k\} = \{0.3, 0.2, 140\}.$$

The soft mask performed better than the hard mask because the best recognition rates from the center speaker based on the hard and soft masks are 93% and 97%, respectively.

Figure 10:
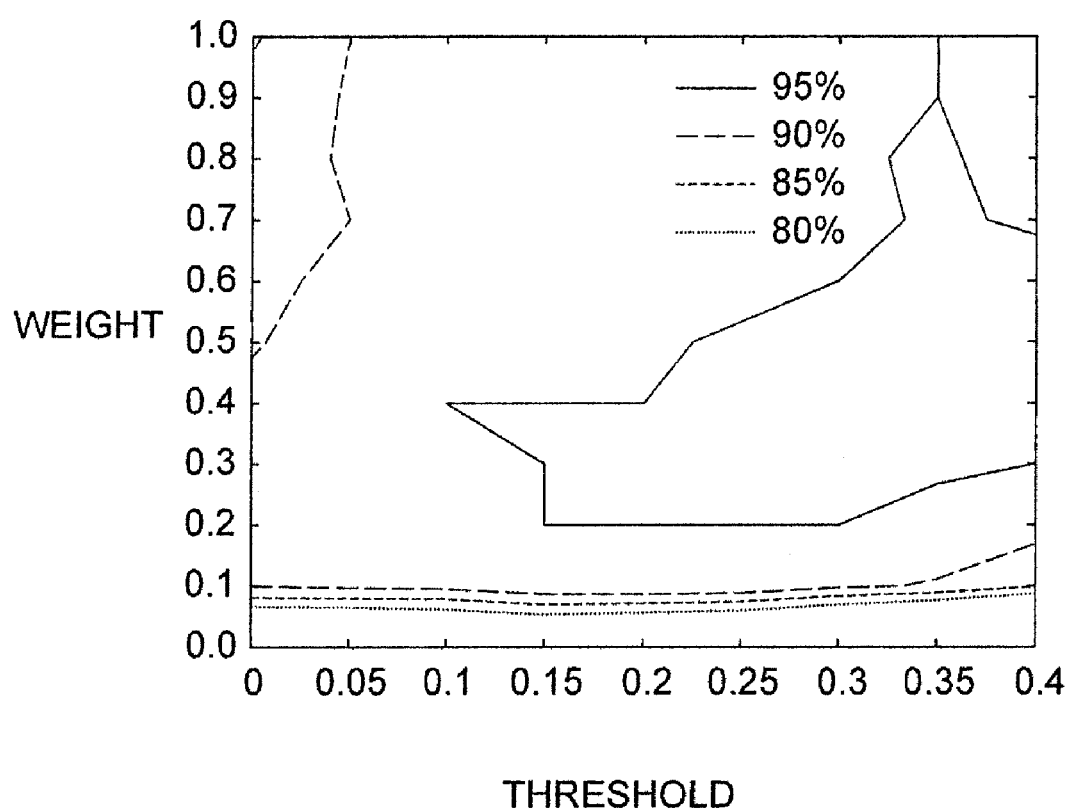
FIG. 10 shows the word recognition rate map of the soft mask for the search space.

FIG. 10 shows the word recognition rate map of the soft mask for the search space. In FIG. 10 "THRESHOLD" indicates $\theta_{soft}$. For the left and right speakers, the parameter set for the peak of a map was similar to the map.

Multiband Julius was used as the ASR. In the experiments, a triphone acoustic model and a grammar-based language model were used to recognize isolated words. The triphone is an HMM which has 3 states and 4 mixtures in each state, and trained on 216 clean phonetically balanced words distributed by ATR. The size of the vocabulary was 200 words.

Figure 11:
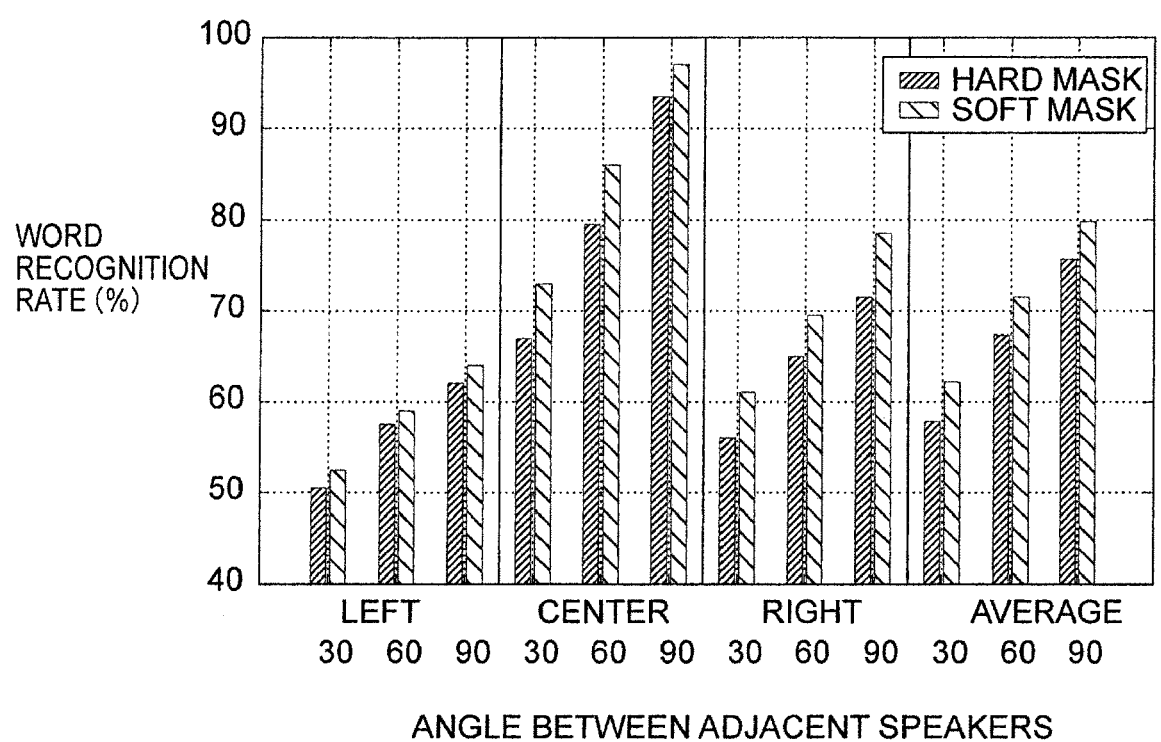
FIG. 11 shows word recognition rates for the hard and soft mask based systems, respectively.

FIG. 11 shows word recognition rates for the hard and soft mask based systems, respectively. These rates are the best rates overall for the search space. The horizontal axis indicates the speakers' positions, and the vertical one indicates the word recognition rates. Details about the searched space is shown in Table 1. For example, "30 and Left" on the horizontal axis means that the recognition target speaker was located at 30 degrees to the left of the center and the other speakers were located at the center and 30 degrees to the right of the center. "60 and center" on the horizontal axis means that the recognition target speaker was located in front of the robot and the other speakers were located to each side at 60 degrees from the center. The word recognition rate of the soft mask based system is higher about 5% in an average than that of the hard mask based system.

Thus, use of appropriately designed and adjusted soft masks has improved word recognition rate of the speech recognition system for simultaneous recognition of multiple sources.

In the embodiments described above, soft masks are determined using reliability of separation R. Instead of reliabilities of separation R, S/N ratios of input speeches obtained in the sound source separating section can be used for setting values of the soft masks.

REFERENCES

[1] Makio Kashino and Tatsuya Hirahara, "One, two, many-judging the number of concurrent talkers," Journal of Acoustic Society of America, vol. 99, no. 4, pp. Pt. 2,2596, 1966.
[2] M. L. Seltzer, B. Raj, and R. M. Stern, "A Bayesian frame work for spectrographic mask estimation for missing feature speech recognition," Speech Communication, vol. 43, pp. 379-393, 2004.
[3] Shun'ichi Yamamoto, Jean-Marc Valin, Kazuhiro Nakadai, Jean Rouat, Francois Michaud, Tetsuya Ogata, and Hiroshi G. Okuno, "Enhanced Robot Speech Recognition Based on Microphone Array Source Separation and Missing Feature Theory," in Proc. of IEEEI CRA-2005, pp. 1489-1494, 2005.
[4] J. Barker, L. Josifovski, M. P. Cooke and P. D. Green, "Soft decision in missing data techniques for robust automatic speech recognition," Proc., ICSLP-2000, 2000.
[5] Yoshitaka Nishimura, Takahiro Shinozaki, Koji Iwano, and Sadaoki Furui, "Noise-Robust Speech Recognition Using Multi-Band Spectral Features," in Proc., 148th Acoustical Society of America Meetings, No. 1aSC7, 2004.
[6] Multiband Julius, "http://www.furui.cs.titech.ac.jp/mbandjulius/".
[7] Tatsuya Kawahara and Akinobu Lee, "Free Software Toolkit for Japanese Large Vocabulary Continuous Speech Recognition," in Proc. of ISCA ICSLP-2000, vol. 4, pp. 476-479, 2000.
[8] Shun'ichi Yamamoto, Kazuhiro Nakadai, Jean-Marc Valin, Jean Rouat, Francois Michaud, Kazunori Komatani, Tetsuya Ogata, and Hiroshi G. Okuno, "Making A Robot Recognize Three Simultaneous Sentences In Real-time," in Proc. of IEEE/RSJIROS-2005, pp. 897-902, 2005.
[9] Lucas C. Parra and Cristopher V. Alvino, "Geometric Source Separation: Merging Convolutive Source Separation with Geometric Beamforming," IEEE Trans. Speech and Audio Processing, vol. 10, no. 6, pp. 352-362, 2002.
[10] Israel Cohen and Baruch Berdugo, "Speech enhancement for non-stationary noise environments," Signal Processing, 81(2), pp. 2403-2418, 2001.
[11] Shun'ichi Yamamoto, Kazuhiro Nakadai, Mikio Nakano, Hiroshi Tsujino, Jean-Marc Valin, Ryu Takeda, Kazunori Komatani, Tetsuya Ogata, and Hiroshi G Okuno, "Genetic Algorithm-Based Improvement of Robot Hearing Capabilities in Separating and Recognizing Simultaneous Speech Signals," in Proc., IEA/AIE-2006 LNAI4031, 2006, pp. 207-217, Springer-Verlag.
[12] Y Ephraim and D. Malah, "Speech Enchancement Using Min-imam Mean-Square Error Log-Spectral Amplitude Estimator," IEEE Trans. Acoust., Speech, Signal Processing, vol. ASSP-33, no. 2, pp. 443-445, 1985.

We claim:

1. A speech recognition system comprising:
multiple sound sources;
a sound source separating section which separates mixed speeches from the multiple sound sources; and
at least one processor configured to:
generate a soft mask which can take continuous values between 0 and 1 for each separated speech according to reliability of separation in separating operation of the sound source separating section, and
recognize speeches separated by the sound source separating section using the soft masks,
wherein the reliability of separation R(f,t) is defined as $$R(f, t) = \frac{\hat{S}_m(f, t) + BN(f, t)}{Y_m(f, t)},$$

where Y is a sum of a speech $\hat{S}_m$, a background noise BN and a leak.

2. A speech recognition system according to claim 1, wherein the soft masks are determined using a sigmoid function $$1/(1+\exp(-a(R-b)))$$

where R represents reliability of separation and a and b represent constants.

3. A speech recognition system according to claim 1, wherein the soft masks are determined using a probability density function of a normal distribution, which has a variable R which represents reliability of separation.

4. A method for generating a soft mask for a speech recognition system, the method comprising:
separating, at a sound source separating section of the speech recognition system, mixed speeches from multiple sound sources;

generating, at a mask generating section of the speech recognition system, a soft mask which can take continuous values between 0 and 1 for each separated speech according to reliability of separation in separating operation of the sound source separating section;

recognizing, at a speech recognizing section of the speech recognition system, speeches separated by the sound source separating section using soft masks generated by the mask generating section, the soft mask being determined using a function of the reliability of separation, which has at least one parameter;

determining a search space of said at least one parameter;

obtaining a speech recognition rate of the speech recognition system while changing a value of the speech recognition system in the search space; and setting the value which maximizes a speech recognition rate of the speech recognition system to said at least one parameter, wherein the reliability of separation R(f,t) is defined as $$R(f,t) = \frac{\hat{S}_m(f,t) + BN(f,t)}{Y_m(f,t)},$$

where Y is a sum of a speech $\hat{S}_m$, a background noise BN and a leak.

5. A method for generating a soft mask for a speech recognition system, the method comprising:

separating, at a sound source separating section of the speech recognition system, mixed speeches from multiple sound sources;

generating, at a mask generating section of the speech recognition system, a soft mask which can take continuous values between 0 and 1 for each separated speech according to reliability of separation in separating operation of the sound source separating section;

recognizing, at a speech recognizing section of the speech recognition system, speeches separated by the sound source separating section using soft masks generated by the mask generating section, the soft mask being determined using a function of the reliability of separation, which has at least one parameter;

obtaining a histogram of the reliability of separation; and determining a value of said at least one parameter from a form of the histogram of the reliability of separation, wherein the reliability of separation R(f,t) is defined as $$R(f,t) = \frac{\hat{S}_m(f,t) + BN(f,t)}{Y_m(f,t)},$$

where Y is a sum of a speech $\hat{S}_m$, a background noise BN and a leak.

6. A method for generating a soft mask for a speech recognition system according to claim 5, wherein assuming that $\mu 1$ and $\mu 2$ ($\mu 1 < \mu 2$)

indicate mean values and $\sigma 1$ and $\sigma 2$ indicate standard deviations and R indicates reliability of separation, the mean values and standard deviations $\mu 1, \mu 2, \sigma 1$ and $\sigma 2$ are estimated by fitting the histogram of reliability of separation R with a first probability density function of normal distribution f1(R) which has $(\mu 1, \sigma 1)$ and a second probability density function of normal distribution f2(R) which has $(\mu 2, \sigma 2)$ and the soft mask is generated using f1(R), f2(R), $\mu 1$ and $\mu 2$.

7. A method for generating a soft mask for a speech recognition system according to claim 6, wherein assuming that a value of the soft mask is S(R) and f(R)=f1(R)+f2(R), S(R)=0 when R<$\mu 1$, S(R)=f2(R)/f(R) when $\mu 1 \leq R \leq \mu 2$ S(R)=1 when $\mu 2$<R.

8. A method for generating a soft mask for a speech recognition system according to claim 6, wherein assuming that a value of the soft mask is S(R), $$f1'(R) = \frac{1}{\sqrt{2\pi\sigma^2}} \text{ when } R < \mu 1,$$

$$f1'(R) = f1(R) \text{ when } \mu 1 \leq R,$$

$$f2'(R) = f2(R) \text{ when } R < \mu 2,$$

$$f2'(R) = \frac{1}{\sqrt{2\pi\sigma^2}} \text{ when } \mu 2 \leq R,$$

and $$f'(R) = f1'(R) + f2'(R),$$

$$SM(R) = \frac{f2'(R)}{f'(R)},$$

wherein SM(R) represents a soft missing feature mask (MFM).

9. A method for generating a soft mask for a speech recognition system according to claim 6, wherein a value of R at the intersection of f1(R) and f2(R) which satisfies $\mu 1 < R < \mu 2$ is set to b and a is determined such that $1/(1+\exp(-a(R-b)))$ is fit to $f2(R)/f(R)$ and the value of the missing feature mask (MFM) S(R) is determined by $S(R)=1/(1+\exp(-a(R-b)))$.

10. A speech recognition system according to claim 1, wherein assuming that $\mu 1$ and $\mu 2$ ($\mu 1 < \mu 2$)

indicate mean values, $\sigma 1$ and $\sigma 2$ indicate standard deviations, and R indicates the reliability of separation, the mean values and standard deviations $\mu 1, \mu 2, \sigma 1$ and $\sigma 2$ are estimated by fitting a histogram of the reliability of separation R with a first probability density function of normal distribution f1(R) which has $(\mu 1, \sigma 1)$ and a second probability density function of normal distribution f2(R) which has $(\mu 2, \sigma 2)$ and the soft mask is generated using f1(R), f2(R), $\mu 1$ and $\mu 2$.

* * * * *